United States Patent
Choi et al.

(10) Patent No.: US 9,799,882 B2
(45) Date of Patent: *Oct. 24, 2017

(54) ELECTRODE ACTIVE MATERIAL AND LITHIUM SECONDARY BATTERY COMPRISING THE SAME

(71) Applicant: LG CHEM, LTD., Seoul (KR)

(72) Inventors: Young Sun Choi, Daejeon (KR);
Seung-Tae Hong, Daejeon (KR);
Soojin Kim, Daejeon (KR); YoungHwa Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 265 days.

This patent is subject to a terminal disclaimer.

(21) Appl. No.: 14/671,747

(22) Filed: Mar. 27, 2015

(65) Prior Publication Data

US 2015/0280233 A1    Oct. 1, 2015

Related U.S. Application Data

(63) Continuation of application No. 13/741,419, filed on Jan. 15, 2013, now Pat. No. 9,017,874, which is a continuation of application No. PCT/KR2011/006845, filed on Sep. 16, 2011.

(30) Foreign Application Priority Data

Sep. 16, 2010 (KR) .................. 10-2010-0090865

(51) Int. Cl.

| | |
|---|---|
| *H01M 4/485* | (2010.01) |
| *H01M 4/13* | (2010.01) |
| *H01M 4/131* | (2010.01) |
| *H01M 4/505* | (2010.01) |
| *H01M 4/525* | (2010.01) |
| *H01M 10/0525* | (2010.01) |
| *H01M 4/56* | (2006.01) |
| *C01G 39/00* | (2006.01) |
| *C01G 39/02* | (2006.01) |
| *H01M 4/02* | (2006.01) |
| *H01M 10/052* | (2010.01) |

(52) U.S. Cl.
CPC ............ *H01M 4/485* (2013.01); *C01G 39/00* (2013.01); *C01G 39/006* (2013.01); *C01G 39/02* (2013.01); *H01M 4/13* (2013.01); *H01M 4/131* (2013.01); *H01M 4/505* (2013.01); *H01M 4/525* (2013.01); *H01M 4/56* (2013.01); *H01M 10/0525* (2013.01); *C01P 2002/50* (2013.01); *C01P 2002/72* (2013.01); *C01P 2006/40* (2013.01); *H01M 10/052* (2013.01); *H01M 2004/028* (2013.01); *H01M 2220/20* (2013.01); *Y02E 60/122* (2013.01); *Y02T 10/7011* (2013.01)

(58) Field of Classification Search
CPC ...... H01M 4/485; H01M 4/131; H01M 4/505; H01M 4/525; H01M 4/56; H01M 4/13; H01M 10/0525; H01M 2004/028; H01M 2220/20; Y02E 60/122; C01G 39/00; C01G 39/02; C01G 39/006
See application file for complete search history.

(56) References Cited

U.S. PATENT DOCUMENTS

| | | | |
|---|---|---|---|
| 6,300,009 | B1 | 10/2001 | Yoshida et al. |
| 6,346,348 | B1 | 2/2002 | Nakajima et al. |
| 2003/0073003 | A1 | 4/2003 | Barker et al. |
| 2009/0004563 | A1 | 1/2009 | Zhong |
| 2009/0104530 | A1 | 4/2009 | Shizuka et al. |
| 2010/0143799 | A1 | 6/2010 | Park |
| 2010/0143803 | A1 | 6/2010 | Park |

FOREIGN PATENT DOCUMENTS

| | | |
|---|---|---|
| EP | 2 202 828 A1 | 6/2010 |
| JP | S56-38769 A | 4/1981 |
| JP | S56-57259 A | 5/1981 |
| JP | 2000-243455 A | 9/2000 |
| JP | 2004-363015 A | 12/2004 |
| JP | 2005-251716 A | 9/2005 |
| JP | 2010-027629 A | 4/2010 |
| JP | 2012-043787 A | 1/2012 |
| KR | 10-2004-0092245 A | 11/2004 |
| KR | 10-2007-0008110 A | 1/2007 |
| KR | 10-2009-7027325 | 6/2013 |

OTHER PUBLICATIONS

Extended European Search Report issued in European patent application No. 11825460.6 dated Dec. 4, 2015.
Gitzendanner et al., "The Synthesis of LiMo4O6, Zn0.5LixMo4O6 and LixMo4O6 (x=0.1) from InMo4O6", Journal of Alloys and Compounds, vol. 218 (1995) pp. 9-12.
XP002750953 Database WPI Week 198127 Thomson Scientific, London, GB AN 1981-48747D Abstract of JPS56-57259, May 19, 1981.
XP002750954 Database WPI Week 198122 Thomson Scientific, London, GB AN 1981-39236D Abstract of JPS56-38769, Apr. 14, 1981.
International Search Report issued in PCT/KR2011/006845, dated Apr. 4, 2012.

*Primary Examiner* — Laura Weiner

(74) *Attorney, Agent, or Firm* — Birch, Stewart, Kolasch & Birch, LLP

(57) ABSTRACT

Disclosed are an electrode active material for lithium secondary batteries, comprising at least one selected from compounds represented by the following formula 1, and a lithium secondary battery comprising the same.

$$Li_xMo_{4-y}M_yO_{6-z}A_z \qquad (1)$$

wherein $0 \leq x \leq 2$, $0 \leq y \leq 0.5$, $0 \leq z \leq 0.5$, M is a metal or transition metal cation having an oxidation number of +2 to +4, and A is a negative monovalent or negative bivalent anion.

11 Claims, 3 Drawing Sheets

[FIG. 1]
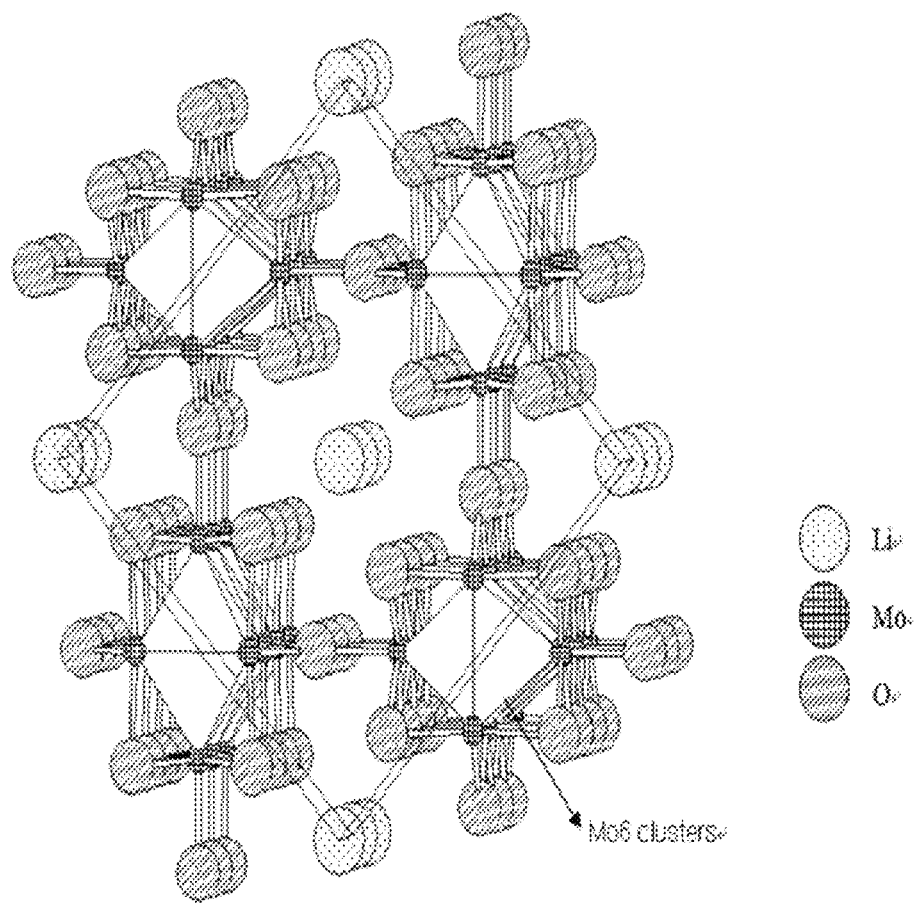

[FIG. 2]
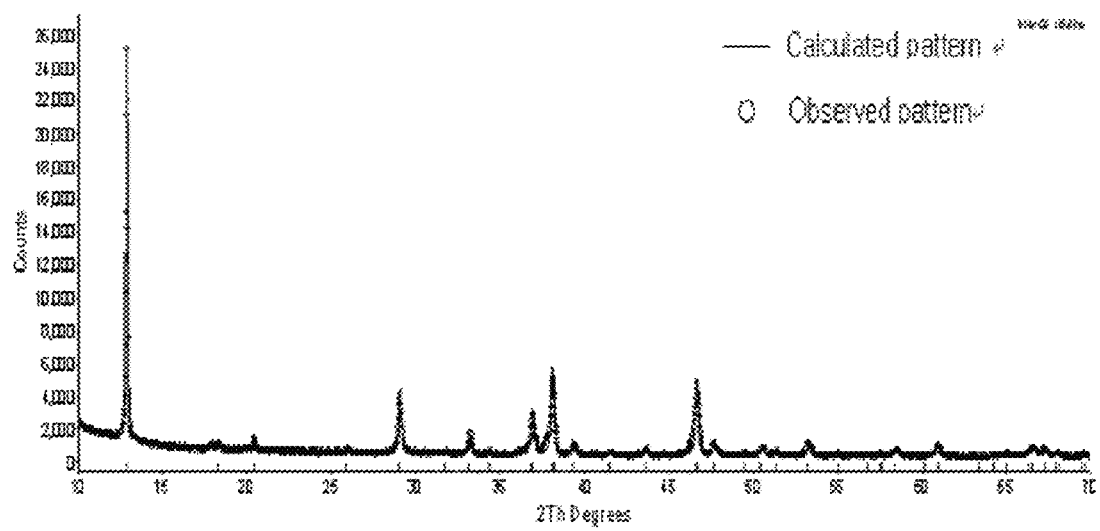
[FIG. 3]
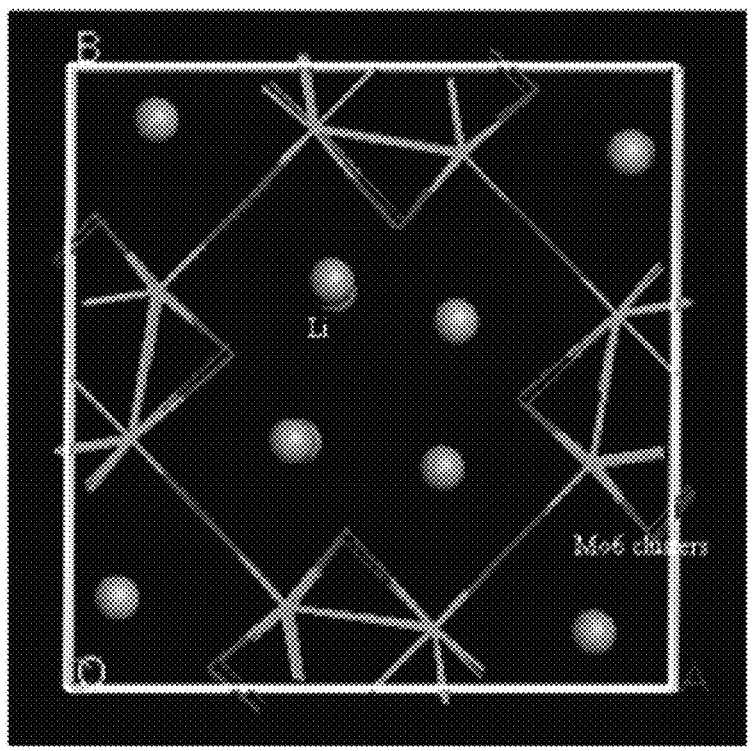

【FIG. 4】
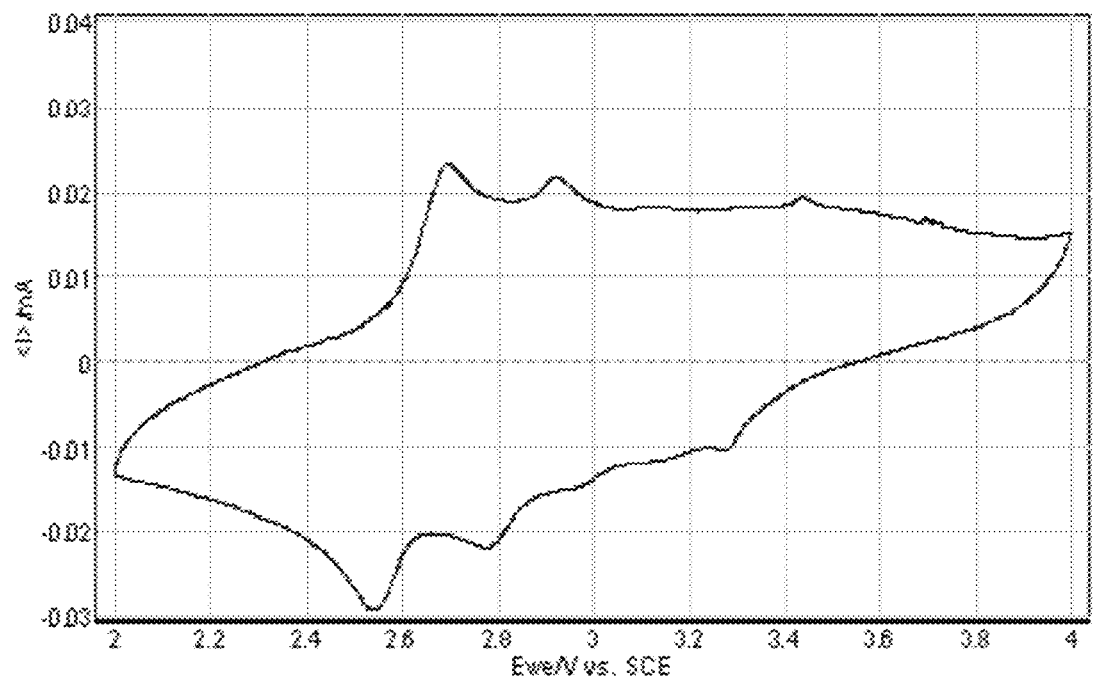
【FIG. 5】
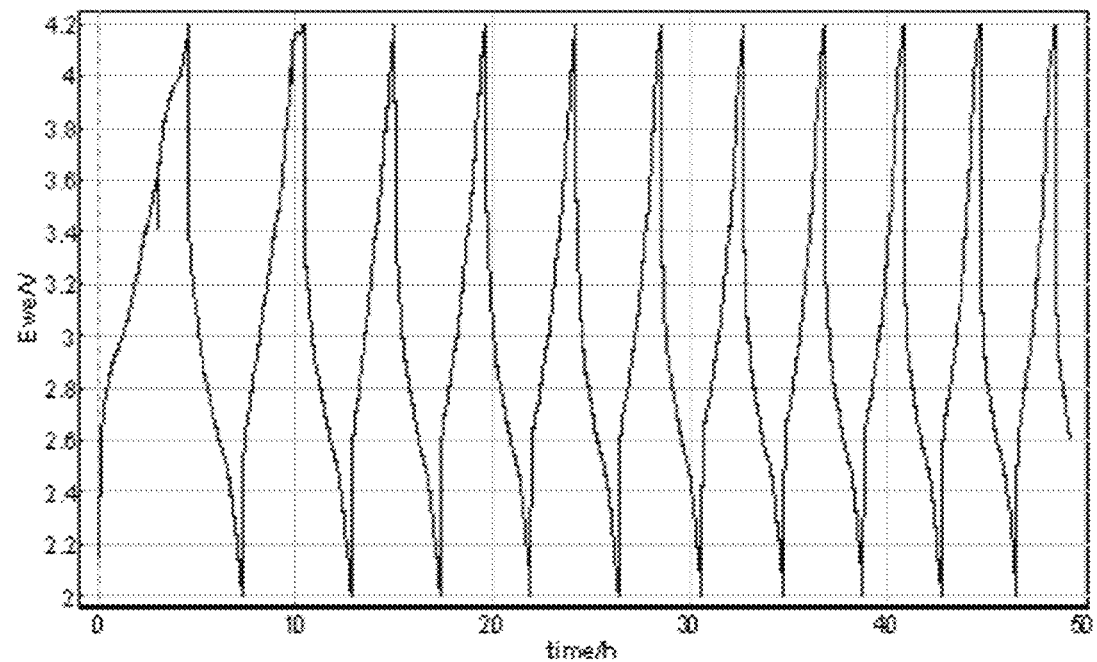

ELECTRODE ACTIVE MATERIAL AND LITHIUM SECONDARY BATTERY COMPRISING THE SAME

CROSS REFERENCE TO RELATED APPLICATIONS

This application is a Continuation of U.S. patent application Ser. No. 13/741,419 filed on Jan. 15, 2013, now U.S. Pat. No. 9,017,874 which is a Continuation of PCT International Application No. PCT/KR2011/006845 filed on Sep. 16, 2011, which claims priority under 35 U.S.C. §119(a) to Patent Application No. 10-2010-0090865 filed in the Republic of Korea on Sep. 16, 2010, all of which are hereby expressly incorporated by reference into the present application.

TECHNICAL FIELD

The present invention relates to a novel electrode active material and a lithium secondary battery comprising the same. More specifically, the present invention relates to a novel electrode active material that undergoes neither structural variation even during repeated charge and discharge nor structural collapse during over-charge, and a lithium secondary battery comprising the same.

BACKGROUND ART

Technological development and increased demand for mobile equipment have led to a rapid increase in the demand for secondary batteries as energy sources. Recently, use of secondary batteries is realized as power sources of electric vehicles (EVs), hybrid electric vehicles (HEVs) and the like. Accordingly, a great deal of research is focused on secondary batteries satisfying various requirements and, in particular, use of lithium secondary batteries with high energy density, high discharge voltage and superior power stability is increasing.

In particular, lithium secondary batteries used for electric vehicles should have high energy density, exhibit great power within a short time and be used under severe conditions for 10 years or longer in which charge and discharge at a high current are repeated for a short time, thus requiring considerably superior safety and long lifespan, as compared to conventional small lithium secondary batteries.

In addition, recently, a great deal of research is focused on use of lithium secondary batteries for power storage devices in which unusable power is converted into physical or chemical energy, stored and used as electric energy, as necessary.

Lithium secondary batteries used for large-sized power storage devices should have high energy density and efficiency, long lifespan and, in particular, should secure safety and reliability, since combustion or explosion upon malfunction of systems may cause major accidents.

In this regard, conventional lithium secondary batteries generally utilize a lithium cobalt composite oxide having a layered structure for a cathode and a graphite-based material for an anode. However, such lithium cobalt composite oxide is unsuitable for electric vehicles or large-capacity power storage devices in terms of extreme expensiveness of cobalt as a main component and safety.

Also, in case of lithium manganese composite oxides, manganese is eluted into an electrolyte during charge and discharge at high temperatures and high currents, causing deterioration in battery characteristics. Also, lithium manganese composite oxides disadvantageously have smaller capacity per unit weight than conventional lithium cobalt composite oxides or lithium nickel composite oxides, thus having a limitation in increase in capacity per unit weight. Accordingly, a great deal of research on active materials comprising other elements is underway.

For example, Korean Patent Laid-open No. 2004-0092245 discloses a cathode active material having a spinel structure for 5V lithium secondary batteries, obtained by preparing a spherical precursor powder which comprises compound represented by $Li_{1+x}[Ni_{(1/2+a)}Mn_{(3/2-2a)}Mo_a]O_4$ ($0 \leq x \leq 0.1$, $0 \leq a \leq 0.1$) and has a particle size of 1 to 5 μm, and calcining the same at 700° C. to 1,100° C. Also, Korean Patent Laid-open No. 2010-0032395 discloses a surface-modified lithium-containing composite oxide with a perovskite structure for cathode active materials for lithium ion secondary batteries, wherein the lithium-containing composite oxide is represented by $Li_pN_xM_yO_zF_a$ (wherein N is at least one element selected from the group consisting of Co, Mn and Ni, M is at least one element selected from the group consisting of transition metal elements other than N; Al, Sn and alkaline earth metal elements, and $0.9 \leq p \leq 1.3$, $0.9 \leq x \leq 2.0$, $0 \leq y \leq 0.1$, $1.9 \leq z \leq 4.2$, $0 \leq a \leq 0.05$). However, these materials still disadvantageously have a limitation in securing structural stability due to repeated deintercalation and intercalation of lithium ions (Li+).

Further, in spite of continuous research to secure stability of cathode active materials, cathode active materials satisfying reliable safety of middle- and large-sized lithium secondary batteries and configurations of lithium secondary batteries comprising the same have not been suggested yet.

DISCLOSURE

Technical Problem

Therefore, the present invention has been made to solve the above and other technical problems that have yet to be resolved.

As a result of a variety of extensive and intensive studies and experiments, the present inventor developed a lithium transition metal oxide having a novel composition and crystal structure for electrode active materials and discovered that this compound has almost no structural variation in spite of repeated deintercalation and intercalation of Li ions during charge and discharge and has no structural collapse even upon over-charge, thus considerably reducing the risk of combustion and explosion of lithium secondary batteries. The present invention has been completed, based on this discovery.

Specifically, an object of the present invention is to provide an electrode active material having a structure in which lithium ions are disposed in the center of a firmly bonded oxide, wherein the structure has no effect on deintercalation and intercalation of the lithium ions during charge and discharge.

Technical Solution

In accordance with one aspect of the present invention, provided is an electrode active material for secondary batteries, comprising at least one selected from compounds represented by the following formula 1:

$$Li_xMo_{4-y}M_yO_{6-z}A_z \qquad (1)$$

wherein $0 \leq x \leq 2$;
$0 \leq y \leq 0.5$;
$0 \leq z \leq 0.5$;

M is a metal cation having an oxidation number of +2 to +4; and

A is a negative monovalent or negative bivalent anion.

The compound may be used for anions and cathodes for lithium secondary batteries, but is preferably used for a cathode active material in order to solve these problems.

Regarding the compound of Formula 1, FIG. 1 schematically shows a crystal structure of the compound.

Referring to FIG. 1, the compound of Formula 1 has a $Mo_4O_6$ laminate structure in which infinite chains including molybdenum (Mo)-molybdenum'(Mo') bonds, and oxygen (O)-molybdenum (Mo)-oxygen (O) bonds are continuously formed in a direction passing through the bottom (paper surface). The infinite chain is disposed in parallel to another infinite chain and is cross-linked thereto through an oxygen (O) bridge to form an open channel in which lithium ions are disposed.

That is, lithium ions are disposed in the center of an oxide having tunnel structures firmly bonded to one another through Mo—Mo'bonds and O—Mo—O bonds, thus not interfering with deintercalation and intercalation of the lithium ions during charge and discharge. The term "tunnel structure" used herein means a hollow enabling easy exchange and intercalation of ions.

Accordingly, the compound does not undergo variation of oxide structure and is thus stable, regardless of movement of lithium ions even upon repeated charge and discharge. This property of the compound is considerably different from that of lithium transition metal oxide having a layered structure such as $LiCoO_2$ or $LiNiO_2$.

Meanwhile, over-charge means a state in which excess lithium ions are deintercalated from the cathode active material. In an over-charge state, when a battery is exposed to a high temperature, $O_2$ is isolated from crystals, and the crystals collapse due to the isolation, thus causing generation of heat. As a result, the temperature of the battery further increases and a vicious circle in which $O_2$ is isolated again occurs.

On the other hand, the compound of Formula 1 constituting the electrode active material of the present invention does not cause structural collapse even upon over-charge in conventional cathode active materials. Accordingly, the compound is suitable for use in lithium secondary batteries for electric vehicles or large-capacity power storage devices which exhibit high energy density and efficiency, and long lifespan and require considerably high safety and reliability in preparation of combustion or explosion upon malfunction of systems caused by high function and large capacity.

In this regard, referring to Formula 1, x is determined within $0 \leq x \leq 2$ and more preferably within $0 \leq x \leq 1$.

$Li_xMo_{4-y}M_yO_{6-z}A_z$ is prepared by substituting In or Na of $InMo_{4-y}M_yO_{6-z}A_z$ or $NaMo_{4-y}M_yO_{6-z}A_z$ by Li. In $InMo_{4-y}M_yO_{6-z}A_z$ or $NaMo_{4-y}M_yO_{6-z}A_z$, In and Na are disposed in the center of holes, while Li may be present in other regions of the holes due to relatively small size thereof. In the preparation process, a mixture of the compound and LiI is heated at 460° C. for 12 hours or longer to make the compound thermodynamically stable. It can be confirmed through elementary analysis that a substitution amount of x may be 1.72 or less. Also, it can be thermodynamically seen through calculation chemistry that the substitution amount of x may be 2 or less and in this case, a Li—O distance is 2.0 Å which is a reliable level. However, during electrochemical intercalation/deintercalation, instead that Li is disposed at a thermodynamically stable position, Li is disposed in the center of holes where it may be readily diffused. Accordingly, x is preferably 1 or less.

In case of x=0, the compound is represented by $Mo_{4-y}M_yO_{6-z}A_z$ in which lithium ions are not present on a cathode. This full-charge state corresponds to over-charge of conventional cathode active materials.

$LiCoO_2$ having a layered structure which is generally used as a cathode active material undergoes structural collapse when all lithium ions move from the cathode to an anode during charge and presence of $CoO_2$ having a layered structure enabling reversible intercalation and deintercalation of lithium ions is thus impossible.

On the other hand, the compound of the present invention, represented by $Mo_{4-y}M_yO_{6-z}A_z$ in which lithium ions are not present, also maintains a stable tunnel structure, does not undergo structural variation in oxide regardless of movement of lithium ions and thus has no structural collapse even in a full-charge state, that is, an over-charge state in conventional cathode active materials.

Meanwhile, in case of x=1, the compound is represented by $LiMo_{4-y}M_yO_{6-z}A_z$ in which lithium ions are crystallographically filled. Lithium secondary batteries are charged while lithium ions move from the cathode to the anode, and they are discharged while the lithium ions move from the anode to the cathode. Accordingly, the case of x=1 means a considerably discharged state.

Accordingly, in this case, high charge efficiency can be obtained, since all of a great amount of lithium ions move to the anode.

Also, in Formula 1, a part of Mo may be substituted by another metal (M) having an oxidation number of +2 to +4. Accordingly, the compound of Formula 1 may be represented by $Li_xMo_4O_{6-z}A_z$ in case of y=0 and may be represented by $Li_xMo_{3.5}M_{0.5}O_{6-z}A_z$ in case of y=0.5.

The transition metal (M) is preferably at least one selected from the group consisting of W, Nb, V, Al, Mg, Ti, Co, Ni and Mn. In this case, preferably, a substitution amount is $0<y \leq 0.5$.

Also, in Formula 1, the oxygen ion may be substituted by an anion (A) having an oxidation number of −1 or −2, and the anion (A) is preferably at least one selected from the group consisting of halogens such as F, Cl, Br and I, S and N. The substitution of these anions improves bonding force to the transition metal and prevents structural deformation of the compound, thus lengthening the lifespan of the batteries. On the other hand, when a substitution amount of the anion (A) is excessively high (z>0.5), the oxide cannot maintain the stable tunnel structure and lifespan is disadvantageously deteriorated.

A method for preparing the compound of Formula 1 is not particularly limited and an example of the method will be described below.

First, the compound can be prepared by synthesizing $M'Mo_4O_6$ at a temperature of 850 to 950° C. for 3 to 5 days using metal (M'), molybdenum (Mo) and molybdenum oxide ($MoO_x$) mixed at a predetermined stoichiometric ratio and reacting the resulting product with lithium iodide (LiI) at a temperature of 400 to 500° C. for 10 to 14 hours to substitute the metal (M') by Li.

In the method, for example, the metal (M') is sodium (Na) or indium (In), and molybdenum oxide ($MoO_x$) is $MoO_2$ in which x is 2, or $MoO_3$ in which x is 3. The addition of both molybdenum oxide ($MoO_x$) and molybdenum (Mo) aims at controlling an oxidation number of Mo.

In order to substitute Mo and oxygen (O) of the electrode active material. $Li_xMo_4O_6$ ($0 \leq x \leq 2$) by a transition metal (M)

and halogen, respectively, the corresponding compounds may be added to the electrode active material before high-temperature reaction.

If desired, when the electrode active material of the present invention is used for a cathode, other oxide such as lithium-containing transition metal oxide or lithium iron phosphorous oxide may be further added to the electrode active material, in addition to the compound of Formula 1.

Examples of the other lithium-containing transition metal oxide include, but are not limited to, layered compounds such as lithium cobalt oxide ($LiCoO_2$) and lithium nickel oxide ($LiNiO_2$), or these compounds substituted by one or more transition metals; lithium manganese oxides such as compounds represented by $Li_{1+y}Mn_{2-y}O_4$ (in which $0 \leq y \leq 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithiated nickel oxides represented by $LiNi_{1-y}M_yO_2$ (M=Co, Mn, Al, Cu, Fe, Mg, B or Ga, and $0.01 \leq y \leq 0.3$); lithium manganese composite oxides represented by $LiMn_{2-y}M_yO_2$ (M=Co, Ni, Fe, Cr, Zn or Ta, and $0.01 \leq y \leq 0.1$), or $Li_2Mn_3MO_8$ (M=Fe, Co, Ni, Cu or Zn); $LiMn_2O_4$ wherein Li is partially substituted by alkaline earth metal ions; disulfide compounds; and $Fe_2(MoO_4)_3$.

Examples of the lithium iron phosphorus oxide include, but are not limited to, $Li_{1+a}Fe_{1-x}Mx(PO_{4-b})X_b$ having an olivine crystal structure (wherein M is at least one selected from Al, Mg, Ni, Co, Mn, Ti, Ga, Cu, V, Nb, Zr, Ce, In, Zn and Y, X is at least one selected from F, S and N, $-0.5 \leq a \leq +0.5$, $0 \leq x \leq 0.5$, $0 \leq b \leq 0.1$).

In this case, the compound of Formula 1 is preferably 50% by weight or more, based on the total weight of the cathode active material.

The present invention also provides an electrode for lithium secondary batteries in which the electrode active material is applied to a current collector. A method for fabricating an anode of electrodes comprising the electrode active material according to the present invention will be described in detail below.

First, the electrode active material of the present invention, and 1 to 20% by weight of a binder and 1 to 20% by weight of a conductive material with respect to the electrode active material are added to a dispersion, followed by stirring to prepare a paste, and the paste is applied to a metal sheet for a current collector, followed by pressing, thereby fabricating a laminate-shaped electrode.

The cathode current collector is generally fabricated to have a thickness of 3 to 500 μm. There is no particular limit as to the cathode current collector, so long as it has suitable conductivity without causing adverse chemical changes in the fabricated battery. Examples of the cathode current collector include stainless steel, aluminum, nickel, titanium, sintered carbon, and aluminum or stainless steel which has been surface-treated with carbon, nickel, titanium or silver. If necessary, these current collectors may also be processed to form fine irregularities on the surface thereof so as to enhance adhesion to the cathode active materials. In addition, the current collectors may be used in various forms including films, sheets, foils, nets, porous structures, foams and non-woven fabrics.

Examples of the binder include polytetrafluoroethylene (PTFE), polyvinylidene fluoride (PVdF), cellulose, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubber, fluororubbers and various copolymers.

Any conductive material may be used without particular limitation so long as it has suitable conductivity without causing adverse chemical changes in the battery. Examples of suitable conductive materials include graphite such as natural graphite and artificial graphite; carbon blacks such as carbon black, acetylene black, Ketjen black, channel black, furnace black, lamp black and thermal black; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and polyphenylene derivatives. Specific examples of commercially available conductive materials may include various acetylene black products (available from Chevron Chemical Company), Denka Black (available from Denka Singapore Private Limited), products (available from Gulf Oil Company), Ketjen black, EC series (available from Armak Company), Vulcan XC-72 (available from Cabot Company), Super P (Timcal Co., Ltd.) and the like.

The filler to inhibit expansion of the cathode may be optionally added. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

Representative examples of the dispersion that can be used in the present invention may include isopropyl alcohol, N-methyl pyrrolidone (NMP) and acetone.

Uniform application of the paste as an electrode material to a metal material may be carried out by conventional methods known in the art or appropriate novel methods, taking into consideration characteristics of materials to be used. For example, the electrode paste is preferably applied to the current collector and then homogeneously dispersed thereon using a doctor blade. Where appropriate, application and dispersion of the electrode paste may also be performed through a single process. Further, the application of the electrode paste may be carried out by a method selected from die casting, comma coating, screen printing and the like. Alternatively, application of the electrode paste may be carried out by molding the paste on a separate substrate and then adhering the same to the current collector via pressing or lamination.

Drying of the paste applied to the metal plate is preferably carried out in a vacuum oven at 50 to 200° C. for 1 to 3 days.

Further, the present invention provides a lithium secondary battery comprising an electrode assembly, in which the above-fabricated cathode faces an anode such that a separator is interposed therebetween, and a lithium salt-containing, non-aqueous electrolyte.

The anode is, for example, fabricated by applying an anode active material to an anode current collector, followed by drying. If desired, the anode may further optionally include other components such as a conductive material, a binder and a filler, as described above.

The anode current collector is generally fabricated to have a thickness of 3 to 500 μm. There is no particular limit as to the anode current collector, so long as it has suitable conductivity without causing adverse chemical changes in the fabricated battery. Examples of the anode current collector include copper, stainless steel, aluminum, nickel, titanium, sintered carbon, and copper or stainless steel which has been surface-treated with carbon, nickel, titanium or silver, and aluminum-cadmium alloys. Similar to the cathode current collector, if necessary, the anode current collector may be processed to form fine irregularities on the surface thereof so as to enhance adhesion to the anode active materials. In addition, the current collector may be used in various forms including films, sheets, foils, nets, porous structures, foams and non-woven fabrics.

Examples of the anode materials that can be used in the present invention include carbon such as non-graphitized carbon and graphitized carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb, Ge; Me': Al, B, P, Si, Group I, II and III elements of the Periodic Table, halogen atoms; $0 \leq x \leq 1$; $1 \leq y \leq 3$; and $1 \leq z \leq 8$); a lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni based materials.

The separator is interposed between the cathode and the anode. As the separator, an insulating thin film having high ion permeability and mechanical strength is used. The separator typically has a pore diameter of 0.01 to 10 μm and a thickness of 5 to 300 μm. As the separator, sheets or non-woven fabrics, or craft papers made of an olefin polymer such as polypropylene and/or glass fibers or polyethylene, which have chemical resistance and hydrophobicity, are used. Typical examples of commercially available products for the separator may include Celgard series such as Celgard® 2400 and 2300 (available from Hoechst Celanese Corp.), polypropylene separators (available from Ube Industries Ltd., or Pall RAI Co.) and polyethylene series (available from Tonen or Entek).

Where appropriate, a gel polymer electrolyte may be coated on the separator to increase battery stability. Representative examples of the gel polymer may include polyethylene oxide, polyvinylidene fluoride and polyacrylonitrile.

When a solid electrolyte such as a polymer is employed as the electrolyte, the solid electrolyte may also serve as both the separator and the electrolyte.

The lithium salt-containing non-aqueous electrolyte is composed of a non-aqueous electrolyte and lithium. As the non-aqueous electrolyte, a non-aqueous electrolytic solution, an organic solid electrolyte and an inorganic solid electrolyte may be utilized.

Examples of the non-aqueous electrolytic solution that can be used in the present invention include non-protic organic solvents such as N-methyl-2-pyrollidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydroxy franc, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte utilized in the present invention include polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymers containing ionic dissociation groups.

Examples of the inorganic solid electrolyte utilized in the present invention include nitrides, halides and sulfates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH and $Li_3PO_4$—$Li_2S$—$SiS_2$.

The lithium salt is a material that is readily soluble in the above-mentioned non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas and may further contain fluoro-ethylene carbonate (FEC), propene sultone (PRS), fluoro-propylene carbonate (FPC) and the like.

As can be seen from examples and experimental examples described below, the lithium secondary batteries according to the present invention exhibit superior lifespan and safety, and in particular, are preferably used as batteries constituting middle- and large-sized battery modules. Accordingly, the present invention provides middle- and large-sized battery modules comprising the secondary batteries as unit batteries.

The middle- and large-sized battery modules are preferably used as power sources such as electric vehicles and hybrid electric vehicles requiring high power and large capacity, as well as large-capacity power storage devices that need to secure safety and reliability due to high power and large capacity.

Accordingly, the present invention provides a device using the battery pack as a power source and, specifically, the battery pack may be used as a power source of electric vehicles (EVs), hybrid electric vehicles (HEVs), plug-in hybrid electric vehicles (PHEVs), or power storage devices.

The configurations of middle- and large-sized battery modules and fabrication methods thereof are well-known in the art and a detailed explanation thereof is thus omitted in this specification.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic view illustrating a $LiMo_4O_6$ crystal structure;

FIG. 2 is a graph showing results of Experimental Example 2;

FIG. 3 is a graph showing results of Experimental Example 3;

FIG. 4 is a graph showing results of Experimental Example 4; and

FIG. 5 is a graph showing results of Experimental Example 5.

BEST MODE

Now, the present invention will be described in more detail with reference to the following examples. These examples are provided only to illustrate the present invention and should not be construed as limiting the scope and spirit of the present invention.

Example 1

In, $MoO_3$ and Mo satisfying a stoichiometric ratio were sealed under vacuum in a silica tube. This tube was heated in a furnace at a temperature of 895° C. for 4 days to perform synthesis, the resulting product and lithium iodide (LiI) were sealed under vacuum in the silica tube and were then reacted at a temperature of 460° C. for 12 hours to prepare lithium molybdenum oxide.

The lithium molybdenum oxide as a cathode active material, KS 6 as a conductive material and KF 1100 as a binder were mixed at a ratio (weight ratio) of 8:1:1, the mixture was stirred together with NMP as a solvent, and the resulting mixture was coated on an aluminum foil as a metal current collector. The resulting product was dried at 120° C. in a vacuum oven for 2 hours or longer to fabricate a cathode.

A coin-type battery was fabricated using the cathode, an anode as a Li metal, a porous polypropylene separator, and a solution of 1M $LiPF_6$ salt in a solvent of ethylene carbonate (EC) and dimethyl carbonate (DMC) mixed at a volume ratio of 1:1, as an electrolyte.

Comparative Example 1

A lithium secondary battery was fabricated in the same manner as in Example 1, except that a cathode active material was prepared using $LiCoO_2$ instead of lithium molybdenum oxide.

Experimental Example 1

The lithium secondary batteries fabricated in Example 1 and Comparative Example 1 were charged and discharged at 2.0 to 4.2V and at the same time, lifespan thereof were measured. The results are shown in Table 1 below.

TABLE 1

|  | Cathode active material | Theoretical capacity | Actual capacity | Mean voltage |
| --- | --- | --- | --- | --- |
| Ex. 1 | $Li_{1+x}Mo_4O_6$ $(0 \leq x \leq 1)$ | 56 mAh/g | 55 mAh/g | 3.4 V |
| Comp. Ex. 1 | $LiCoO_2$ | 273 mAh/g | 150 mAh/g | 3.8 V |

As can be seen from Table 1 above, the compound according to the present invention exhibited an actual capacity comparable to theoretical capacity, in spite of having a smaller capacity than $LiCoO_2$, and a high mean voltage of 3.4 V, when used for a cathode active material.

Experimental Example 2

The lithium molybdenum oxide prepared in Example 1 was subjected to X-ray diffraction (XRD).

XRD data was obtained at room temperature using a Bragg-Brentano diffractometer (Bruker-AXS D4 Endeavor) equipped with a Cu X-ray tube and Lynxeye detector under conditions of an angle increase by 0.025° and an angle range of 10°≤2θ≤70°. The X-ray diffraction data was subjected to Rietveld refinement using a TOPAS program and the results are shown in FIG. 2.

Preparation of the lithium molybdenum oxide could be seen from characteristic peaks of FIG. 2.

Experimental Example 3

The lithium molybdenum oxide obtained in Example 1 was reacted with LiI at 460° C. for 12 hours and the reaction was continuously repeated. At this time, a content of Li in the synthesized substance was measured using ICP-AES (Perkin-Elmer). As a result, Li was substituted at a ratio of 1.72 or less, with respect to Mo. It could be seen from calculation chemistry that a Li—O distance was 2.0 Å which is a reliable level, when a substitution amount of Li was thermodynamically calculated to 2, with respect to Mo. FIG. 3 schematically shows this crystal structure.

Experimental Example 4

For the coin batteries fabricated in Example 1, electric properties of the cathode active material were evaluated using an electrochemical analyzer (VSP, Bio-Logic Science Instruments). The coin batteries were tested at 0 to 4.0V and at a scanning rate of 0.5 mV/s using cyclic voltammetry (CV). The results are shown in FIG. 4.

As can be seen from FIG. 4, Li ions are reversibly intercalated and deintercalated to lithium molybdenum oxide according to the present invention.

Experimental Example 5

For the coin batteries fabricated in Example 1, electric properties of the cathode active material were evaluated using an electrochemical analyzer (VSP, Bio-Logic Science Instruments). The coin batteries were tested in a charge-discharge mode at 2.0 to 4.2V. The results are shown in FIG. 5.

As can be seen from FIG. 5, the secondary battery using the lithium molybdenum oxide according to the present invention as a cathode active material had a capacity of about 55 mAh/g, corresponding to 98% of the theoretical capacity and a mean voltage of 3.4V. Also, an SOC state can be easily observed through OCV because the charge and discharge graph has linearity.

INDUSTRIAL APPLICABILITY

As apparent from the afore-going, lithium secondary batteries using the electrode active material according to the present invention undergo neither structural variation of oxide even during repeated charge and discharge nor structural collapse during over-charge, thus securing safety and being advantageously useful for power sources of electric vehicles or large-capacity power storage devices.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:
1. A cathode active material for secondary batteries comprising at least one selected from compounds having a function of being capable of deintercalation and intercalation of lithium ions, represented by the following formula 1:

 (1)

wherein
$0 < x \leq 2$;
$0 < y \leq 0.5$;
$0 \leq z \leq 0.5$;
M is at least one selected from the group consisting of W, Nb, V, Al, Mg, Ti, Co, Ni and Mn; and
A is at least one selected from the group consisting of halogen, S and N.

2. The cathode active material according to claim 1, wherein x satisfies $0 < x \leq 1$.

3. A cathode in which the cathode active material according to claim 1 is applied to a current collector.

4. A lithium secondary battery comprising the cathode according to claim 3.

5. The lithium secondary battery according to claim 4, the lithium secondary battery comprises an anode comprising carbon, metal composite oxides, a lithium metal, lithium alloys, silicon-based alloys, tin-based alloys, metal oxides, conductive polymers, or Li—Co—Ni based materials,
wherein the anode comprising carbon is non-graphitized carbon and graphitized carbon,
wherein the metal composite oxides is $Li_xFe_2O_3$ ($0 \leq x \leq 1$), $Li_xWO_2$ ($0 \leq x \leq 1$) or $Sn_xMe_{1-x}Me'_yO_z$ (Me: Mn, Fe, Pb, Ge; Me': Al, B, P, Si, Group I, II and III elements of the Periodic Table, halogen atoms; $0 < x \leq 1$; $1 \leq y \leq 3$; and $1 \leq z \leq 8$),
wherein the metal oxides is at least one selected from the group consisting of SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$, or
wherein the conductive polymers is polyacetylene.

6. The lithium secondary battery according to claim 5, wherein the anode comprises the carbon that is non-graphitized carbon and graphitized carbon.

7. The lithium secondary battery according to claim 5, wherein the anode comprises the metal composite oxides that is $Li_xFe_2O_3$ ($0 \leq x \leq 1$), $Li_xWO_2$ ($0 \leq x \leq 1$) or $Sn_xMe_{1-x}Me'_yO_z$ (Me: Mn, Fe, Pb, Ge; Me': Al, B, P, Si, Group I, II and III elements of the Periodic Table, halogen atoms; $0 < x \leq 1$; $1 \leq y \leq 3$; and $1 \leq z \leq 8$).

8. The lithium secondary battery according to claim 5, wherein the anode comprises the metal oxides that is at least one selected from the group consisting of SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$.

9. The lithium secondary battery according to claim 5, wherein the anode comprises the conductive polymers that is polyacetylene.

10. A battery module comprising the lithium secondary battery according to claim 4 as a unit battery.

11. A power storage device comprising the battery module according to claim 10.

* * * * *